O. E. HAGLUND.
MOTOR VEHICLE PROPELLING ATTACHMENT.
APPLICATION FILED NOV. 4, 1919.

1,354,103. Patented Sept. 28, 1920.

Inventor
Otto E. Haglund

UNITED STATES PATENT OFFICE.

OTTO E. HAGLUND, OF MEDINA, NORTH DAKOTA.

MOTOR-VEHICLE PROPELLING ATTACHMENT.

1,354,103.  Specification of Letters Patent.  Patented Sept. 28, 1920.

Application filed November 4, 1919. Serial No. 335,671.

*To all whom it may concern:*

Be it known that I, OTTO E. HAGLUND, a citizen of the United States, residing at Medina, in the county of Stutsman, State of North Dakota, have invented certain new and useful Improvements in Motor-Vehicle Propelling Attachments; and I do hereby declare the following to be a full, clear, and exact description of the invention, such as will enable others skilled in the art to which it appertains to make and use the same.

This invention relates to motor vehicles, and more especially to the propulsion thereof; and the present case is an improvement over my patent dated April 30, 1918, and bearing the number 1,264,389. In that case propeller wheels driven from the rear axle were carried at the rear ends of tubular casings swung from the axle itself, and the driving mechanism was carried through the casings. The present invention consists in utilizing the same form of driving mechanism, but leading it forward from the rear axle and alongside the machine and providing lever mechanism by means of which the operator can throw the driving mechanism into contact with the surface or raise it out of such contact at will.

This invention is applicable to motor vehicles mostly and mainly when the wheels thereof are removed and replaced by runners, and the propeller wheels are of such character that they will work in snow or on ice, and for coasting purposes or on long down grades the invention is quite useful because it permits the operator to raise the propelling wheels entirely off the snow and ice.

One manner of carrying out the invention is set forth in the following specification and reference is made to the drawings wherein.

Figure 2:
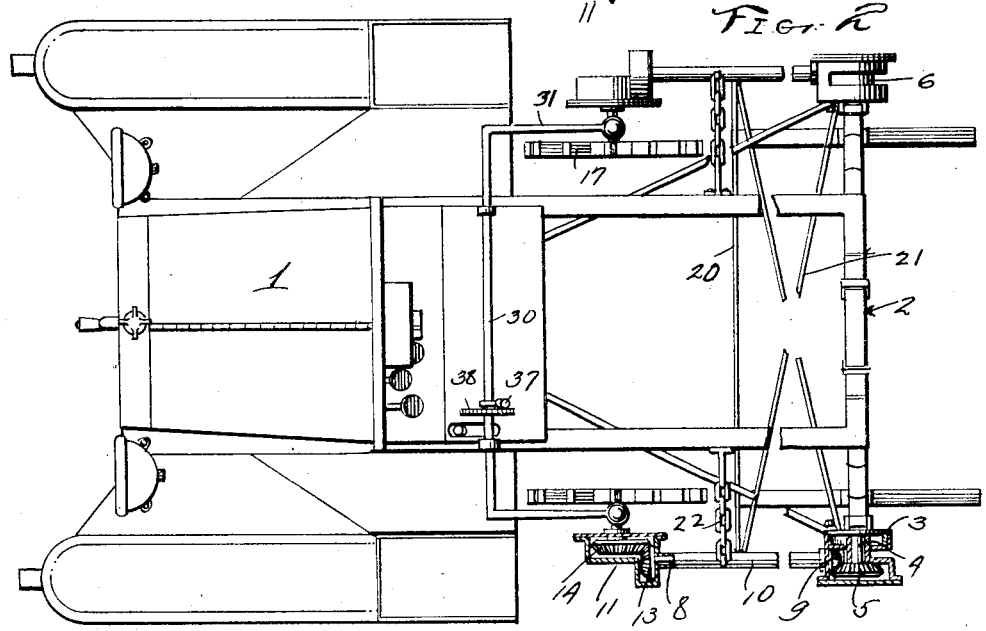
Fig. 2 is a plan view, one of the casings being in section to show the connection between the driving axle and the driven shaft.
Figure 3:
Fig. 3 is an enlarged detail of the connection between the adjusting crank and the driving mechanism.

The motor vehicle 1 has a rear axle 2 incased in the usual housing 3 and having spindles 4. From these the rear wheels are removed, and to the spindles are applied the hubs of beveled gears 5, each within a box or casing 6 which is mounted so as to swing around the hub of the gear. This casing is connected with another casing 11 by a tubular hanger or sleeve 10. The bevel gear 5 meshes with another bevel gear 9 from which a shaft 8 leads through the sleeve to a bevel gear 13 within the casing 11, and a bevel gear 14 meshes therewith and carries a shaft 16 which in turn carries the propeller wheel 17 having its active face or periphery toothed or spiked or otherwise formed so as to engage with ice, snow, or any character of roadway on which the machine is to be used. The rear wheels are replaced by runners 18, and the front wheels by runners 19. Braces 20 connect the two hangers 10 and lead under the frame of the machine as seen in Fig. 2, and also oblique braces 21 may be employed. Thus far the construction may be precisely the same as set forth in my prior patent, excepting that the hangers 10 lead forward from the rear axle instead of rearward.

Coming now to the present invention, I first provide chains 22, one on each side connecting the frame of the machine with the hanger 10 or the casing 11, the obvious purpose being to prevent the propeller wheel from dropping too low in case it should pass over a rather deep rut. When this wheel trailed as in my former patent, a chain or its equivalent was not necessary, but when the driving mechanism is, as it were, pushed forward of the rear axle and capable of swinging around the same, some safety device becomes desirable to prevent the propeller wheel or wheels from dropping too low in case of ruts or soft spots in the surface traveled over. As seen in the drawings, the running boards and rear fenders will have to be removed from the motor vehicle, but otherwise no change is necessary as power from the engine drives the rear axle, and the latter through the propelling mechanism rotates the propeller wheels which exert traction on the surface unless purposely raised off of it.

Figure 1:
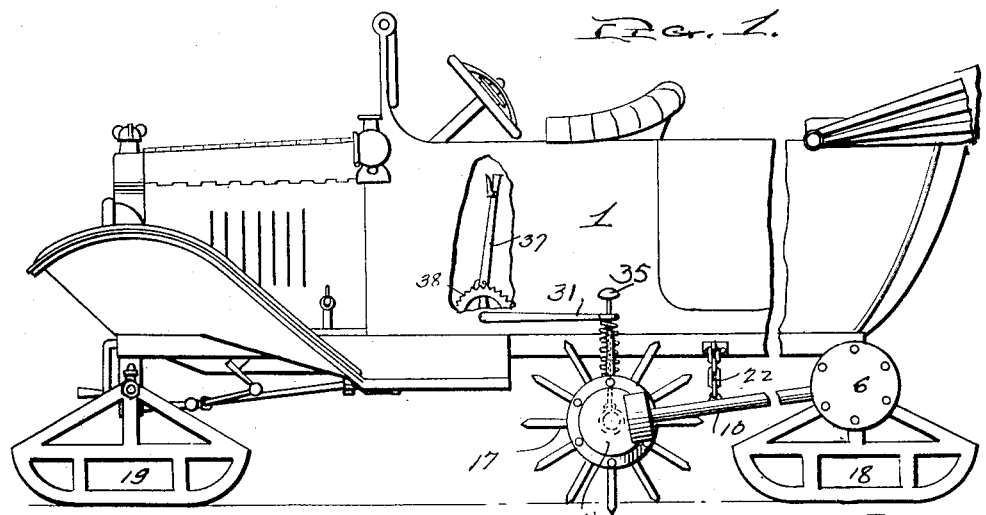
Figure 1 is a side elevation of a motor vehicle equipped with this invention.

Mounted in bearings on and extending across the frame is a shaft 30 having at each end a crank 31 from which a rod 32 leads downward to and is pivotally connected at 33 with the driving mechanism. The outer end of the crank 31 preferably has a loop or eye 34 through which the rod 32 passes freely and above which it has a head 35, and an expansive spring 36 is coiled on the rod between its loop or eye and the pivot point 33. Thus descent of the eye will press down on the spring and bear the driving mechanism downward until its propeller wheel engages the earth, but should said wheel run over a stone or other obstruction it may rise because the spring will compress and the headed end of the rod will move through the loop or eye. The connection with the other driving mechanism is duplicated at the other far side of Fig. 1, but of course cannot be seen. The chains 22 prevent the two mechanisms from dropping too low, and the brace rods 20 and 21 connect the mechanisms and to a certain extent cause them to rise and fall in unison, although the position of these rods should be such as to permit both propeller wheels to be raised completely off the surface.

For controlling the position of the crank shaft 30 the same is provided with a hand lever 37 which by preference has a thumb latch engaging a toothed sector 38, and by this means the operator is permitted to raise or lower the driving mechanism at will, while he yet has the usual control over the engine and therefore over the rotation of the rear axle in either direction.

What is claimed is:

1. The combination with a motor vehicle and its rear axle, and propelling mechanism including a propeller wheel, a hanger pivoted on and leading forward from said axle, and driving connections leading from the axle along the hanger to the propeller wheel; of flexible connections between the frame of the motor vehicle and said hanger for limiting the descent of the propeller wheel, a spring bearing said wheel downward and manually operable means for resisting said wheel at will.

2. The combination with a motor vehicle and its rear axle, and propelling mechanism including a propeller wheel, a hanger pivoted on and leading forward from said axle, and driving connections leading from the axle along the support to the propeller wheel; of manually operable mechanism for raising or lowering said propeller wheel or pressing it into contact with the surface at will, and means within said mechanism permitting it to yield against said pressure when the propeller is forced upward.

3. The combination with a motor vehicle and its rear axle, and propelling mechanism including a propeller wheel, a hanger therefor pivoted on and leading forward from said axle, and driving connections leading from the axle along the hanger to the propeller wheel; of a manually adjustable crank mounted on the vehicle body and having an eye, a rod connected with the hanger and passing through said eye and headed, and an expansive spring between the hanger and eye, for the purpose set forth.

In testimony whereof, I affix my signature, in the presence of two witnesses.

OTTO E. HAGLUND.

Witnesses:
 E. V. OPP,
 E. J. REMBOLDT.